Patented July 4, 1950

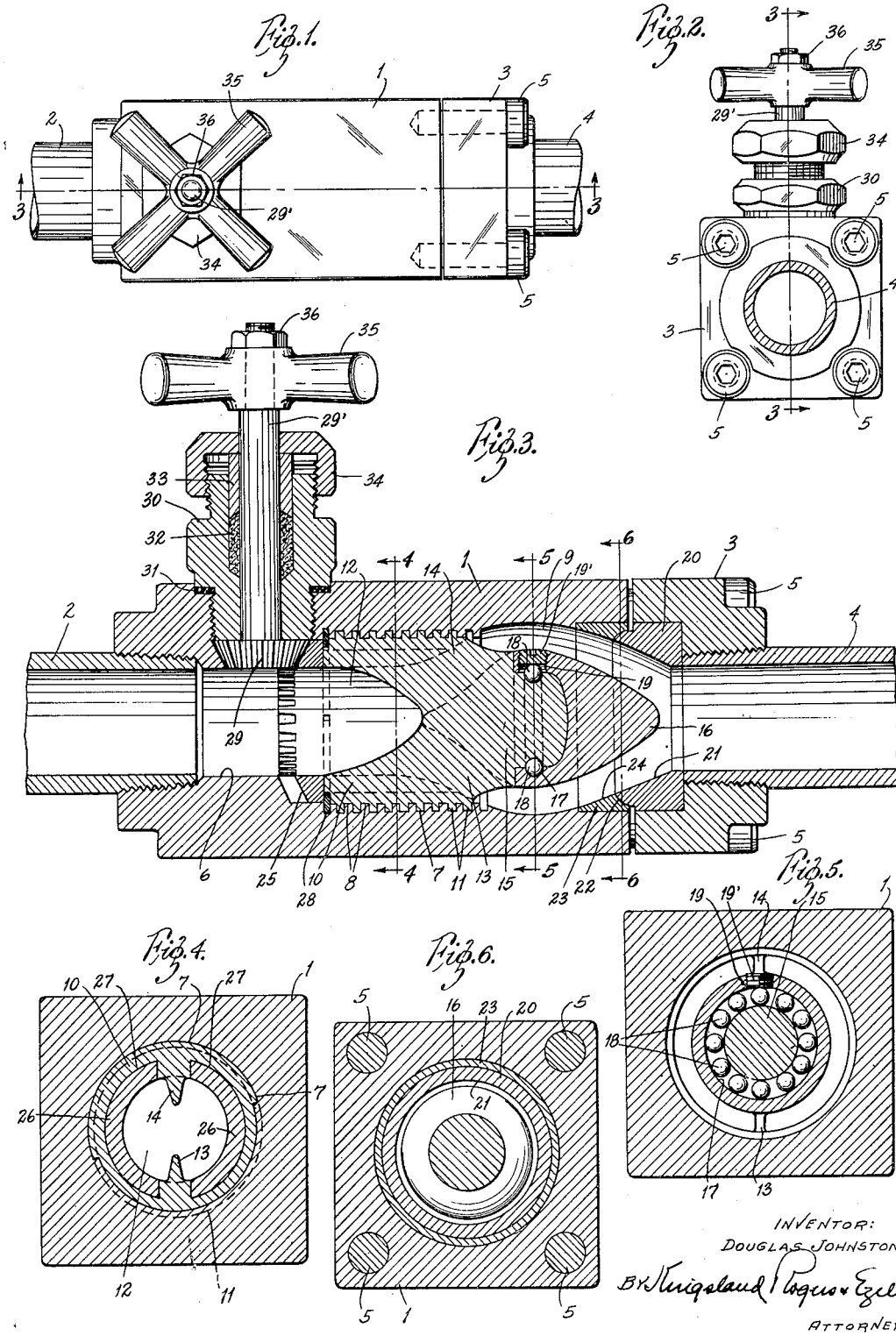

2,513,650

UNITED STATES PATENT OFFICE 2,513,650

FREE FLOW VALVE

Douglas Johnston, Alexandria, Va.

Application June 9, 1944, Serial No. 539,464

6 Claims. (Cl. 251—42)

This invention relates to valves, and more particularly to an improved globe type of valve especially useful in controlling conduits having fluid therein under high pressure.

An object of the invention is to produce an improved globe type valve in which fluid friction losses will be so reduced to a minimum as to permit free flow of fluid past the valve parts.

A further object is to so construct a valve that a smooth streamlined passage free from abrupt direction changes and rough edges will be provided for fluid flow.

A further object is to produce a valve of the globe type which is easy to operate, is economical to manufacture, and which has simply constructed parts so assembled that the valve can be easily serviced.

In the drawings:

Fig. 1 is an external view of a valve structure embodying the invention, said valve being shown associated with piping;

Fig. 2 is an end view of the valve structure;

Fig. 3 is a longitudinal sectional view taken on the line 3—3 of Fig. 2; and

Figs. 4, 5 and 6 are cross-sectional views taken on the lines 4—4, 5—5, and 6—6, respectively, of Fig. 3.

Referring to the drawings in detail, numeral 1 indicates a valve casing which is adapted to be attached at one end to a pipe 2, its other end having secured thereto a cap 3 to which a pipe 4 is connected, the cap being secured to the valve casing 1 by bolts 5. Extending in an axial direction through the valve casing is a passage having one end portion 6 of a diameter the same as the internal diameter of the pipe 2, an intermediate portion 7 of a larger diameter, and provided with threads 8, and another end portion 9 also of larger diameter than the end portion 6, and having a wall which is curved in the manner shown.

Associated with the passage through the casing is a member 10 provided with external threads 11 for cooperation with the internal threads 8 of the intermediate portion 7, whereby the member will be caused to move axially when rotated. The member 10 is hollow to provide a through passage 12 which is flared at its end facing the cap end of the casing 1. The member 10 has two webs 13 and 14 which extend from the flaring surface of the passage 12 and provide means for carrying an extending part or portion 15 which is of general conical shape on its end which faces toward and is spaced from the flared portion of the passage 12. Thus, fluid which enters the passage 12 from the passage portion 6 of the casing can flow outwardly in a streamlined manner around the extending part 15.

The extending part 15 is provided with a knob which has mounted thereon a valve element or part 16 also of general conical shape to form with the extending part a somewhat egg-shaped body, said valve element being of a size smaller than the curved portion 9 of the passage through the casing in order to permit space for fluid to flow around the valve element. The valve element and the knob are provided with complementary grooves which provide an annular recess 17 of circular cross section, into which may be positioned a plurality of balls 18 to thus maintain the valve element on the extending part 15 yet permit said valve element to have relative rotation on said extending part. The balls may be inserted through an opening 19 in the valve element which is closed by a plug 19'.

The cap 3 for the valve casing carries a valve seat 20 having a conical surface 21 flaring inwardly for cooperation with the conical valve element 16. This valve seat 20 is also arranged with a curved end surface 22 for engaging an annular sealing member carried by the end of the casing member. This sealing member 23 has an inner curved surface 24 to provide a smooth surface between the portion 9 of the casing passage and the end of the conical surface 21 of the valve seat.

In order that the member 10 may be rotated, there is provided a beveled gear 25 which has extensions 26 fitting into axially extending recesses 27 in the inner surface of the member 10. The gear is journaled in the casing adjacent the threads 8 and held from axial movement by a split washer 28 carried in a groove in the valve casing. The connecting arrangement between the gear and the member 10 is such that the member will be rotated by the gear yet is free to move axially under the action of the threads.

The gear 25 has meshing therewith a second beveled gear 29 secured to the end of a shaft 29' positioned normal to the axis of the casing. The shaft is journaled in a bonnet 30 screwed into the valve casing, said bonnet being sealed with the casing by a gasket 31. The shaft is sealed with the bonnet by a packing 32 and the usual gland 33 and gland nut 34. The outer end of the shaft has secured thereto a handle 35 held on the shaft by a nut 36.

*Operation*

When the valve is fully open, the parts thereof will be in the positions shown in Fig. 3. Assuming that the flow of fluid through the valve is from the pipe 2 to the pipe 4, the fluid will flow through the passage portion 6 through the passage 12 in the member 10, where it will be directed around the conical shaped extending part 15 into the curved portion 9 of the passage in the casing 1, and then around the valve element 16 and out into the pipe 4. It will be noted that the path of flow is streamlined and that the general direction of flow is not changed at any time as the fluid passes through the valve. When the valve is fully open as shown in Fig. 3, the cross-sectional area of the passage formed by the space between the part 15, together with the valve element 16 and the passage portion 9, together with the surface 24 of the sealing member and the conical surface 21 of the valve seat, is such that it is greater than the cross-sectional area of the pipes, so there will be no restricting action at the valve. Also, since the direction of flow is only changed to a small degree, which change is brought about gradually, the frictional losses will be maintained at a minimum.

When it is desired to close the valve, such is accomplished by merely rotating the handle 35, which will result in the rotation of the member 10 by the gearing and movement of this member 10 axially to the right as viewed in Fig. 3, thus bringing the valve element 16 into engagement with the conical surface of the seat 20. The valve element, since it is freely rotatable on the member 10, will assume a firm seat, thus cutting off flow of fluid through the valve. It is to be particularly noted that in moving the valve element the arrangement employed provides a very large thread area for the movable member, which, of course, amply supports the load required to seat the valve element. Since the gears also provide a gear reduction between the handle and the member 10, the closing of the valve against very high pressures can be accomplished with a minimum of manual effort.

It is to be noted also that the valve can be very economically manufactured. No patterns or castings are required for the main parts, which can be easily made out of bar stock having standard structural shapes. The valve also can be very easily serviced since, if it is desired to regrind the valve seat or the valve element, these parts can be reached by merely removing the cap 3. When the cap is removed, the seat is readily accessible. Also the valve element 16 can now be moved to an accessible and removable position where it will project out of the end of the casing by merely rotating the member 10. Attention is also called to the particular arrangement of the cap and the pipe 4. No special union is required as is the case of conventional valves. The seal 22 between the seat carried in the cap and the casing 1 takes the place of any special union.

Being aware of the possibility of modifications in the particular valve structure disclosed without departing from the fundamental principles of the invention, it is to be understood that it is not desired that the scope of the invention be limited except as set forth by the appended claims.

What is claimed is:

1. In a valve, a valve body having a single direction passage and being provided with internal threads extending over a portion of the length of the passage, means providing a valve seat for the passage axially spaced from the threads, a member positioned in the passage and having a portion with external threads for cooperation with the internal threads and another portion spaced axially from the first portion, and at the end carrying a valve part for cooperation with the valve seat, said extending portion and valve part being so related to the passage that when the part is unseated a surrounding channel will be established between said extension and part and the passage wall, said member being provided with a passage extending through the member from inside the threaded portion at the end opposite the valve part toward the valve part and outwardly to the surface of the member rearwardly of the valve part, and means for rotating the member from the exterior of the valve body.

2. In a valve, a valve body having a single direction passage and being provided with internal threads extending over a portion of the length of the passage, means providing a valve seat for the passage axially spaced from the threads, a member positioned in the passage and having external threads for cooperation with the internal threads and an axially extending portion at the end carrying a valve part for cooperation with the valve seat, said extending portion and valve part being so related to the passage that when the part is unseated a surrounding channel will be established between said extending portion and part and the passage wall, said member being provided with a passage extending through the member from the end opposite the valve part to the surface of the member rearwardly of the valve part, a hollow gear journaled in the valve body passage, interengaging means between the member and gear for rotating the member by the gear but permitting axial movement of the member, a second gear meshing with the first gear, and a shaft journaled in the valve body for rotating the second gear from the exterior.

3. In a valve, a valve body having a passage therethrough, a valve seat at one end of the passage, a member positioned in the passage and carrying a valve part for cooperation with the seat, means providing a flow channel through the member and around the valve part when said part is unseated, cooperating threads on the body and member for moving the member axially in the passage by a rotation of the member, an annular rotatable element fixed against axial movement and disposed within the passage adjacent the member, cooperating means carried by the element and member for rotating said member by the element but permitting the member to move axially relative to the element, and means for rotating the element.

4. In a valve, a valve body having a flow passage therethrough, an annular valve seat therein, the passage walls upstream from the seat tapering smoothly outwardly axially of the passage and merging into a generally cylindrical surface upstream from the tapering portion, a valve member disposed within the flow passage and axially movable therein for movement toward and from the valve seat, said valve member comprising a valve head of generally egg shape, smaller than the wide part of the passage but larger than the valve seat whereby to engage the valve seat to cut-off flow, but to avoid undue obstruction of flow when unseated, a skirt like member of cylindrical shape having an outer surface bearing on the generally cylindrical part of the inner walls of the valve body upstream of the valve seat, for support during movement, web means extending radially inward from said skirt member and axially toward the valve seat, and supporting the valve head to extend downstream from the skirt member, and operating means engageable with the skirt member to move it axially and to move the valve toward and from the valve seat, said operating means comprising a rotatable member secured to and extending through the wall of the valve body, interengaging means between the skirt member and the valve body to provide defined movement of the skirt member relatively to the body, the rotatable member being engageable with the skirt member so that rotation of the rotatable member effects displacement of the skirt member, as provided by the interengaging means, to displace the valve.

5. In a valve, a valve body having a flow passage therethrough, an annular valve seat therein, the passage walls upstream from the seat tapering smoothly outwardly axially of the passage and merging into a generally cylindrical surface upstream from the tapering portion, a valve member disposed within the flow passage and axially movable therein for movement toward and from the valve seat, said valve member comprising a valve head of generally egg shape, smaller than the wide part of the passage but larger than the valve seat whereby to engage the valve seat to cut-off flow, but to avoid undue obstruction of flow when unseated, a skirt like member of cylindrical shape having an outer surface bearing on the generally cylindrical part of the inner walls of the valve body upstream of the valve seat, for support during movement, web means extending radially inward from said skirt member and axially toward the valve seat, and supporting the valve head to extend downstream from the skirt member, operating means to move the skirt member axially and to move the valve toward and from the valve seat, said last-named means comprising interengaging threads on the contiguous surfaces of the skirt member and passage walls, a rotary member disposed at the upstream end of the skirt member and having slotted portions fitting into the skirt member and interlocking therewith, and means to rotate the rotary member.

6. In a valve, a valve body having a flow passage therethrough, an annular valve seat therein, the passage walls upstream from the seat tapering smoothly outwardly axially of the passage and merging into a generally cylindrical surface upstream from the tapering portion, a valve member disposed within the flow passage and axially movable therein for movement toward and from the valve seat, said valve member comprising a valve head of generally egg shape, smaller than the wide part of the passage but larger than the valve seat whereby to engage the valve seat to cut-off flow, but to avoid undue obstruction of flow when unseated, a skirt like member of cylindrical shape having an outer surface bearing on the generally cylindrical part of the inner walls of the valve body upstream of the valve seat, for support during movement, web means extending radially inward from said skirt member and axially toward the valve seat, and supporting the valve head to extend downstream from the skirt member, operating means engageable with the skirt member to move it axially and to move the valve toward and from the valve seat, said last-named means comprising interengaging threads on the contiguous surfaces of the skirt member and passage walls, a rotary member disposed at the upstream end of the skirt member, said rotary member having a substantially cylindrical, axial projection closely interfitting against the inner wall of the skirt member, interlocking parts on the projection and skirt member to cause the latter to be rotated by the former, and means to rotate the rotary member.

DOUGLAS JOHNSTON.

REFERENCES CITED

The following references are of record in the file of this patent:

UNITED STATES PATENTS

| Number    | Name    | Date          |
|-----------|---------|---------------|
| 1,436,768 | Mackie  | Nov. 28, 1922 |
| 1,710,214 | Hassold | Apr. 23, 1929 |
| 1,731,184 | Thomas  | Oct. 8, 1929  |
| 2,030,332 | Spear   | Feb. 11, 1936 |
| 2,133,983 | Gaston  | Oct. 25, 1938 |

FOREIGN PATENTS

| Number  | Country       | Date    |
|---------|---------------|---------|
| 103,751 | Great Britain | of 1916 |